United States Patent
Mahmoud (10) Patent No.: US 10,500,981 B1
(45) Date of Patent: Dec. 10, 2019

(54) CHILD CAR SEAT SAFETY SYSTEM

(71) Applicant: Ibrahim Mahmoud, Ormond Beach, FL (US)

(72) Inventor: Ibrahim Mahmoud, Ormond Beach, FL (US)

( * ) Notice: Subject to any disclaimer, the term of this patent is extended or adjusted under 35 U.S.C. 154(b) by 0 days.

(21) Appl. No.: 16/167,599

(22) Filed: Oct. 23, 2018

(51) Int. Cl.
| | |
|---|---|
| *G08B 21/00* | (2006.01) |
| *B60N 2/00* | (2006.01) |
| *G08B 21/02* | (2006.01) |
| *B60N 2/28* | (2006.01) |

(52) U.S. Cl.
CPC ............... *B60N 2/002* (2013.01); *B60N 2/28* (2013.01); *G08B 21/0222* (2013.01); *G08B 21/0225* (2013.01); *G08B 21/0269* (2013.01); *G08B 21/0283* (2013.01)

(58) Field of Classification Search
None
See application file for complete search history.

(56) References Cited

U.S. PATENT DOCUMENTS

| | | | |
|---|---|---|---|
| 7,009,522 B2 | 3/2006 | Flanagan | |
| 7,339,463 B2 | 3/2008 | Donaldson | |
| 9,393,897 B2 * | 7/2016 | Gomez-Collazo | ..... B60N 2/002 |
| 9,457,716 B2 | 10/2016 | Westmoreland | |
| 9,545,856 B2 * | 1/2017 | Borgne | ..................... B60N 2/26 |
| 9,569,948 B1 | 2/2017 | Platt | |
| D797,591 S | 9/2017 | Amos | |
| 10,102,782 B1 * | 10/2018 | Konshin | ............. G09F 13/0413 |
| 2005/0236480 A1 * | 10/2005 | Vrotsos | ................ G06Q 20/341 |
| | | | 235/439 |
| 2014/0253314 A1 * | 9/2014 | Rambadt | ................ B60N 2/002 |
| | | | 340/457.1 |

FOREIGN PATENT DOCUMENTS

WO        2009144687        1/2010

* cited by examiner

*Primary Examiner* — Adolf Dsouza
(74) *Attorney, Agent, or Firm* — Kyle A. Fletcher, Esq.

(57) ABSTRACT

The child car seat safety system comprises a master system, a pressure sensor, and a cable. The cable electrically connects the pressure sensor to the master system. The pressure sensor is monitored by the master system. The pressure sensor detects when a passenger is in the child safety seat. The master system communicates with the personal data device. If the master system determines that the span of the distance between the master system and the personal data device is too greater the master system sends a first message to the personal data device. The master system further monitors the temperature in the air around the child safety seat. If the measured temperature exceeds a previously determined maximum temperature, the master system sends a second message to an appropriate authority.

16 Claims, 6 Drawing Sheets

CHILD CAR SEAT SAFETY SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles, more specifically, a passenger detection system formed in a seat specially adapted for a vehicle. (B60N2/002)

SUMMARY OF INVENTION

The child car seat safety system is configured for use with a child safety seat. The child car seat safety system is configured for use with a passenger. The child car seat safety system detects when the passenger is in the child safety seat. The child car seat safety system is configured for use with a personal data device. The child car seat safety system creates a first wireless communication link with the personal data device. The child car seat safety system is configured for use with a commercially provided and publicly available cellular wireless network. The child car seat safety system creates a second wireless communication link with the commercially provided and publicly available cellular wireless network.

The child car seat safety system comprises a master system, a pressure sensor, and a cable. The cable electrically connects the pressure sensor to the master system. The pressure sensor is monitored by the master system. The pressure sensor detects when the passenger is seated in the child safety seat. The master system further communicates with the personal data device over the first wireless communication link. If the master system determines that the span of the distance between the master system and the personal data device is greater than a previously determined distance then the master system sends a first message to the personal data device over the first wireless communication link. If the master system determines that the first wireless communication link has failed then the master system sends a first message to the personal data device over the second wireless communication link and the commercially provided and publicly available cellular wireless network. The master system further monitors the temperature in the air around the child safety seat. If the measured temperature exceeds a previously determined maximum temperature, the master system sends a second message to an appropriate authority over the second wireless communication link and the commercially provided and publicly available cellular wireless network.

The first message is a message indicating that the passenger remains in the child safety seat. The second message is a message indicating that the passenger is in a dangerous environment. Both the first message and the second message contain the GPS coordinates of the master system.

These together with additional objects, features and advantages of the child car seat safety system will be readily apparent to those of ordinary skill in the art upon reading the following detailed description of the presently preferred, but nonetheless illustrative, embodiments when taken in conjunction with the accompanying drawings.

In this respect, before explaining the current embodiments of the child car seat safety system in detail, it is to be understood that the child car seat safety system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the child car seat safety system.

It is therefore important that the claims be regarded as including such equivalent construction insofar as they do not depart from the spirit and scope of the child car seat safety system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
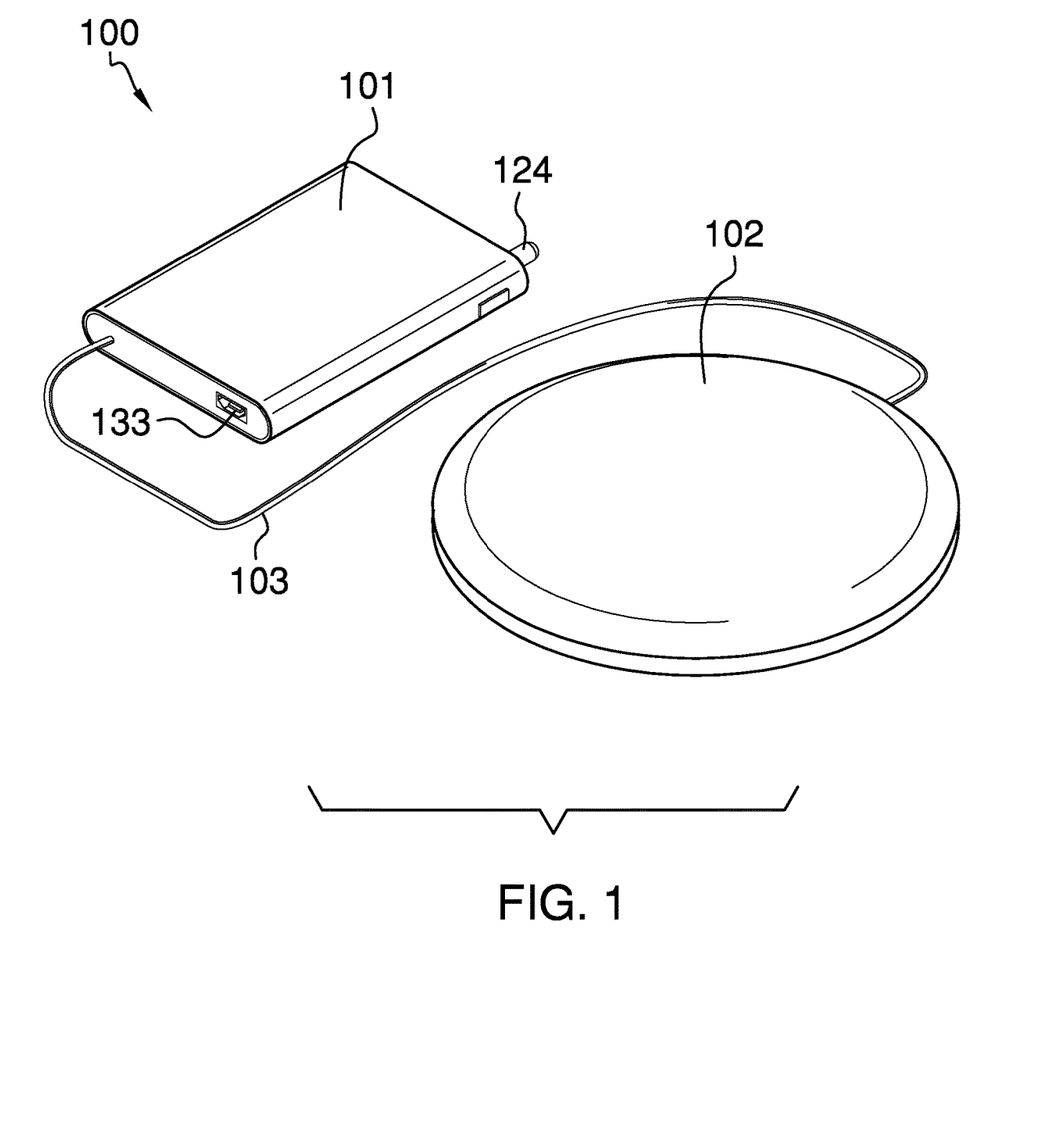
FIG. 1 is a perspective view of an embodiment of the disclosure.
Figure 2:
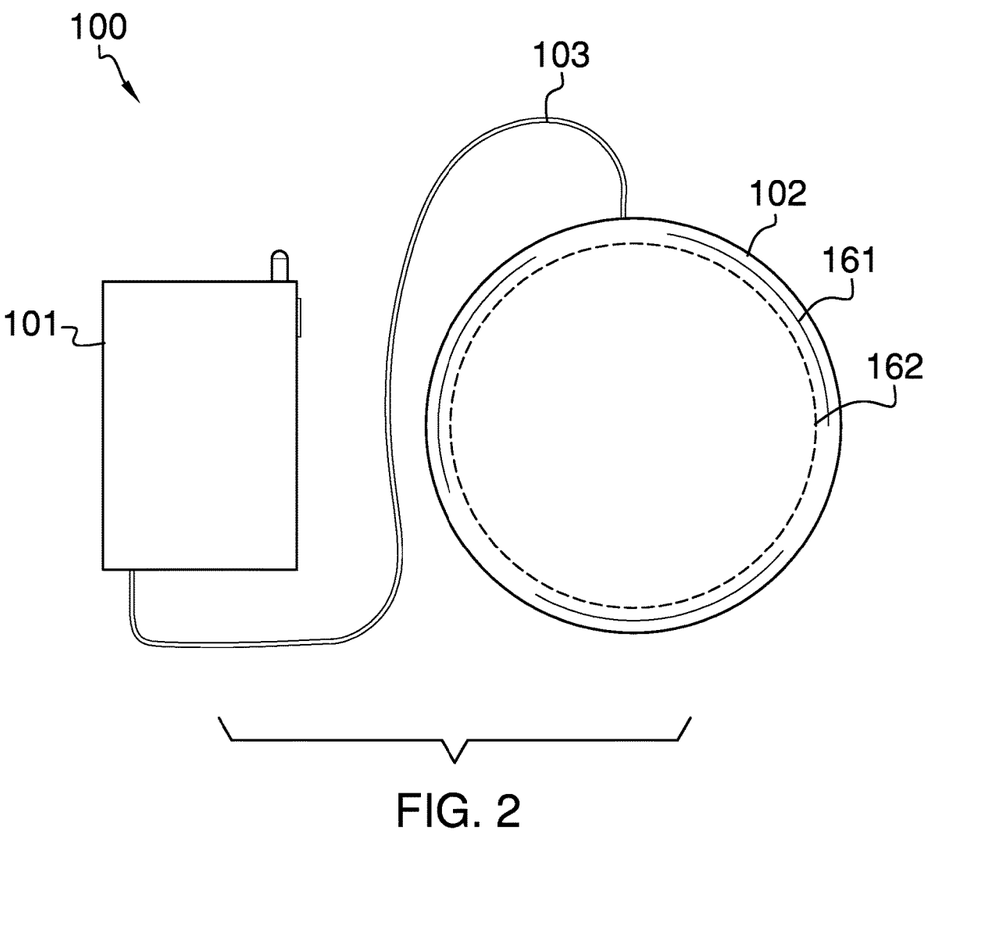
FIG. 2 is a front view of an embodiment of the disclosure.
Figure 3:
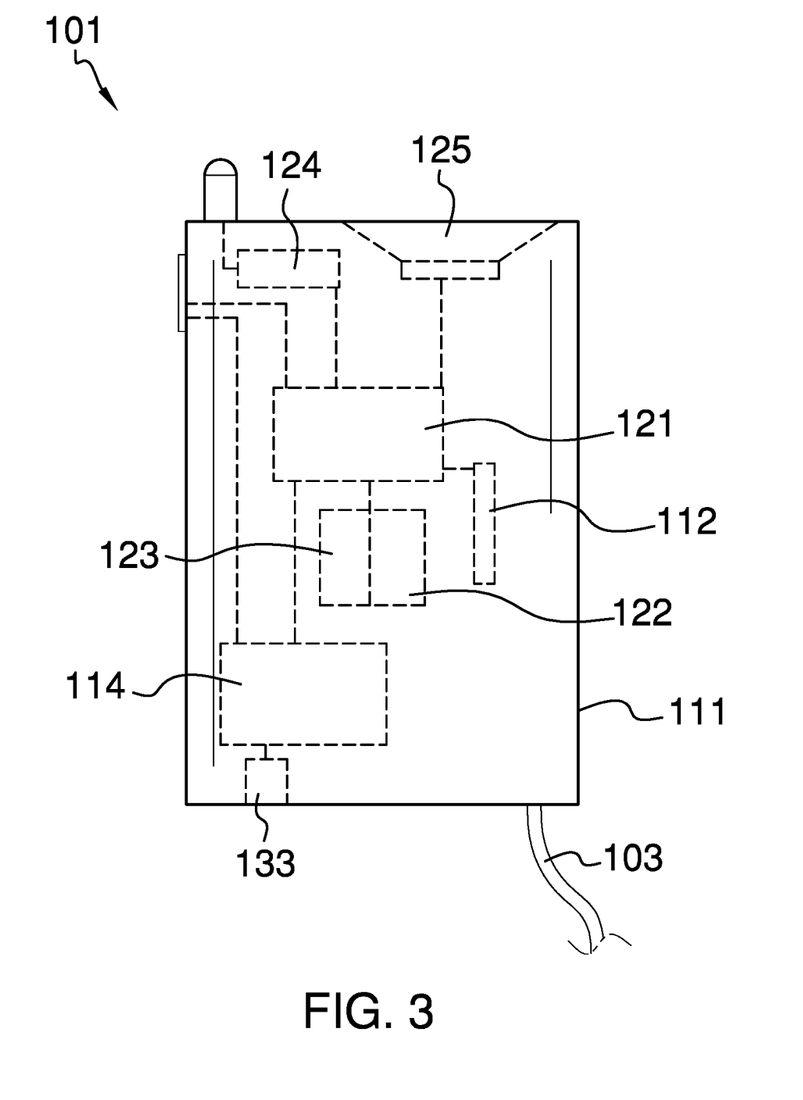
FIG. 3 is a rear view of an embodiment of the disclosure.
Figure 4:
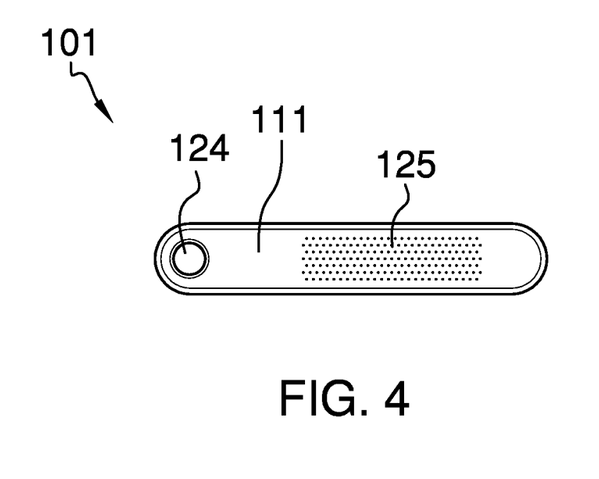
FIG. 4 is a top view of an embodiment of the disclosure.
Figure 5:
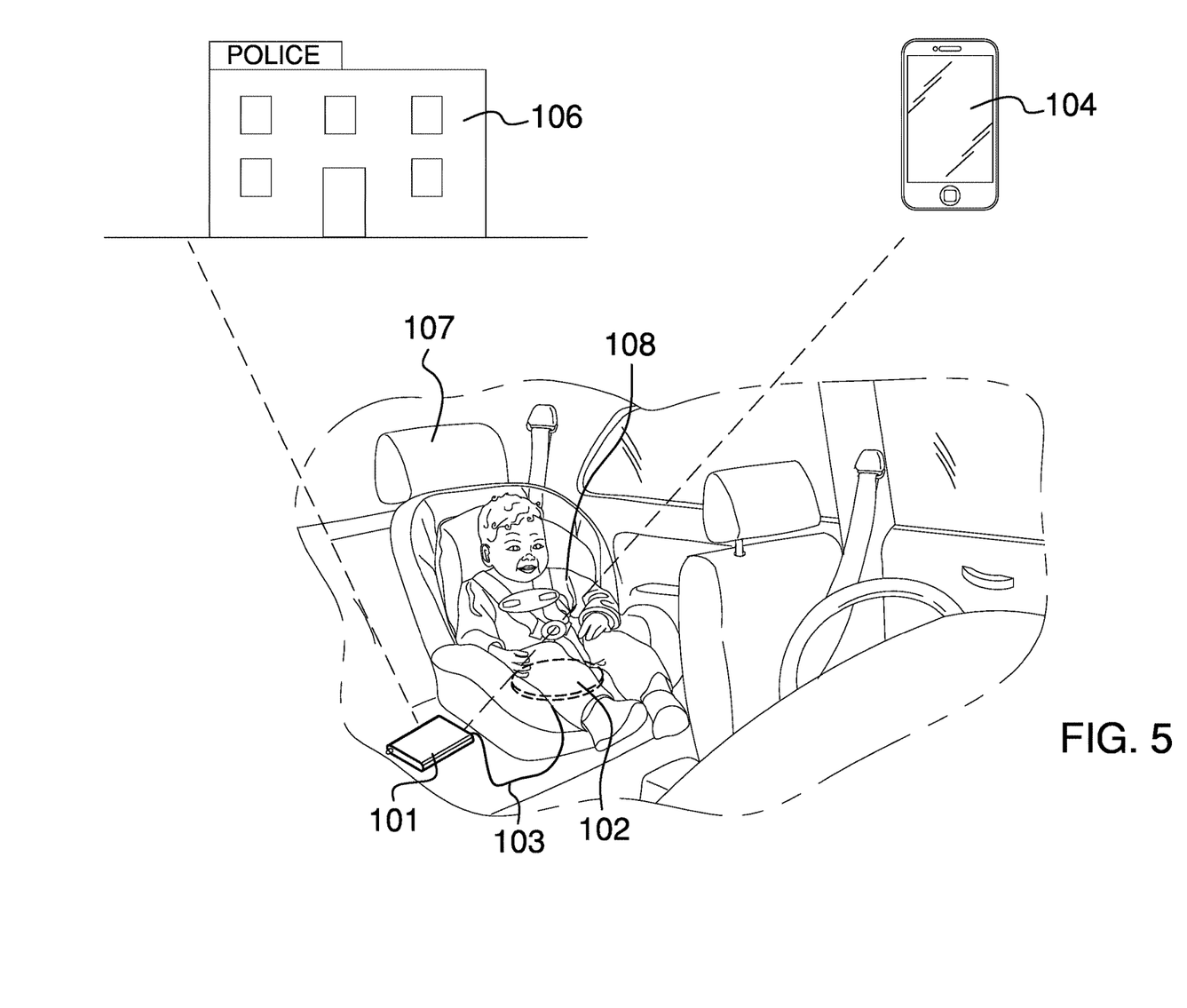
FIG. 5 is an in-use view of an embodiment of the disclosure.
Figure 6:
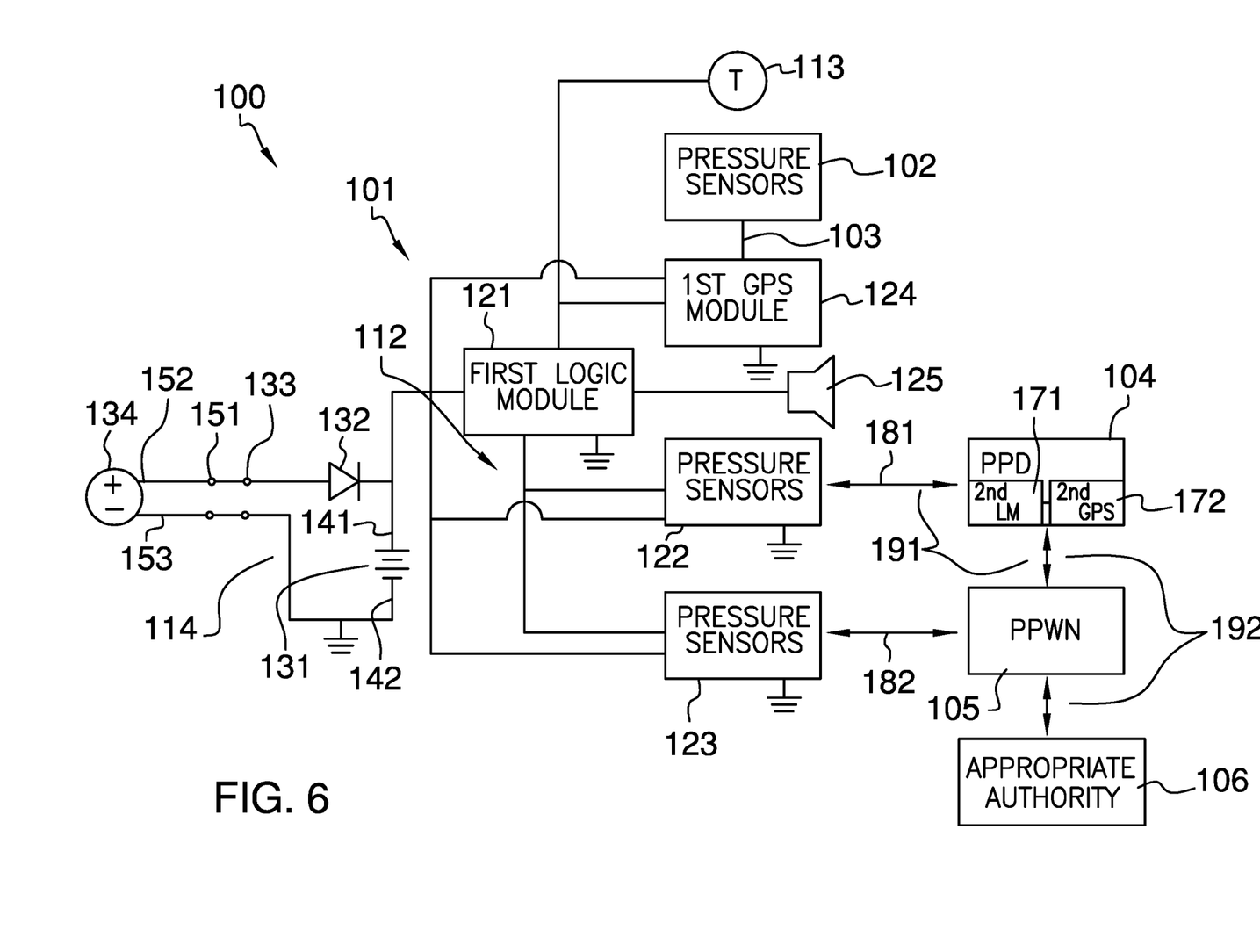
FIG. 6 is a block diagram of an embodiment of the disclosure.

Detailed reference will now be made to one or more potential embodiments of the disclosure, which are illustrated in FIGS. 1 through 6.

The child car seat safety system 100 (hereinafter invention) is configured for use with a child safety seat 107. The invention 100 is configured for use with a passenger 108. The invention 100 detects when the passenger 108 is in the child safety seat 107. The invention 100 is configured for use with a personal data device 104. The invention 100 creates a first wireless communication link 181 with the personal data device 104. The invention 100 is configured for use with a commercially provided and publicly available cellular wireless network 105. The invention 100 creates a second wireless communication link 182 with the commercially provided and publicly available cellular wireless network 105.

The invention 100 comprises a master system 101, a pressure sensor 102, and a cable 103. The cable 103 electrically connects the pressure sensor 102 to the master system 101. The pressure sensor 102 is monitored by the master system 101. The pressure sensor 102 detects when the passenger 108 is seated in the child safety seat 107. The master system 101 further communicates with the personal data device 104 over the first wireless communication link 181.

The following three paragraphs describe the theory of operation of the invention 100.

If the master system 101 determines that the span of the distance between the master system 101 and the personal data device 104 is greater than a previously determined distance then the master system 101 sends a first message 191 to the personal data device 104 over the first wireless communication link 181. If the master system 101 determines that the first wireless communication link 181 has failed then the master system 101 sends the first message 191 to the personal data device 104 over the second wireless communication link 182 and the commercially provided and publicly available cellular wireless network 105.

The master system 101 further monitors the temperature in the air around the child safety seat 107. If the measured temperature exceeds a previously determined maximum temperature, the master system 101 sends a second message 192 to the personal data device 104 over the second wireless communication link 182 and the commercially provided and publicly available cellular wireless network 105. If the measured temperature exceeds a previously determined maximum temperature, the master system 101 sends the second message 192 to an appropriate authority 106 over the second wireless communication link 182 and the commercially provided and publicly available cellular wireless network 105.

The first message 191 is a message indicating that the passenger 108 remains in the child safety seat 107. The second message 192 is a message indicating that the passenger 108 is in a dangerous environment. Both the first message 191 and the second message 192 contain the GPS coordinates of the master system 101.

The commercially provided and publicly available cellular wireless network 105 is defined in greater detail elsewhere in this disclosure. The appropriate authority 106 is defined in greater detail elsewhere in this disclosure. The child safety seat 107 is defined in greater detail elsewhere in this disclosure. The passenger 108 refers to an individual who sits in the child safety seat 107.

The personal data device 104 is a programmable electrical device that provides data management and communication services through one or more functions referred to as an application. The application is a set of logical operating instructions that are performed by the personal data device 104. The addition of an application will provide increased functionality for the personal data device 104. Within the context of this disclosure, it is assumed that an application has been developed for the purpose of interacting with the invention 100. The disclosure assumes that an individual responsible for the well-being of the passenger 108 sitting in the child safety seat 107 monitors the personal data device 104.

The personal data device 104 comprises a second logic module 171 and a second GPS module 172. The second logic module is a readily and commercially available programmable electronic device that is used to manage, regulate, and operate the personal data device 104. The second logic module 171 is provisioned with the personal data device 104. The second GPS module 172 is an electrical device that communicates with the GPS to determine the GPS coordinates of the second GPS module 172. When queried by the second logic module 171, the second GPS module 172 transfers the GPS coordinates to the second logic module 171.

The cable 103 is an electrically conductive structure used to transmit signals between the pressure sensor 102 and the master system 101. The use of a cable 103 for this purpose is well-known and documented in the electrical arts.

The master system 101 is an electrical circuit that controls the operation of the invention 100. The master system 101 manages the communication between the invention 100 and the personal data device 104. The master system 101 manages the communication between the invention 100 and the appropriate authority 106. The master system 101 monitors the air temperature at the child safety seat 107. The master system 101 generates an audible sound when an alarm condition occurs. The master system 101 comprises a first housing 111, a control circuit 112, a temperature sensor 113, and a power circuit 114. The control circuit 112, the temperature sensor 113, and the power circuit 114 are electrically interconnected.

The first housing 111 is a casing. The first housing 111 contains the control circuit 112, the temperature sensor 113, and the power circuit 114. The first housing 111 is formed with all apertures and form factors necessary to allow the first housing 111 to accommodate the use and operation of the invention 100. The structure of the first housing 111 is independent of the structure of the pressure sensor 102 such that the master system 101 and the pressure sensor 102 are physically independent structures from each other. Methods to form a housing suitable for the purposes described in this disclosure are well-known and documented in the mechanical arts.

The control circuit 112 is an electrical circuit. The control circuit 112 is a programmable circuit. The control circuit 112 manages and regulates the operation of the master system 101. The control circuit 112 comprises a first logic module 121, a first communication module 122, a second communication module 123, a first GPS module 124, and a speaker 125. The first logic module 121, the first communication module 122, the second communication module 123, the first GPS module 124, and the speaker 125 are electrically interconnected.

The first logic module 121 is a readily and commercially available programmable electronic device that is used to manage, regulate, and operate the master system 101. Depending on the specific design and the selected components, the first logic module 121 can be a separate component within the master system 101 or the functions of the first logic module 121 can be incorporated into another component within the master system 101. The first communication module 122 is a wireless electronic communication device that allows the first logic module 121 to wirelessly communicate with the locally presented personal data device 104. Specifically the first communication module 122 establishes a first wireless communication link 181 between the master system 101 and the personal data device 104. In the first potential embodiment of the disclosure the first communication module 122 supports a communication protocol selected from the group consisting of a WiFi protocol or a Bluetooth protocol.

The second communication module 123 communicates SMS and MMS messages between the first logic module 121 and a recipient selected from the group consisting of an appropriate authority 106 and the personal data device 104. The first logic module 121 communicates with the selected recipient through a commercially provided and publicly available cellular wireless network 105. The use of a commercially provided and publicly available cellular wireless network 105 is preferred because: 1) of its low cost; 2) of the widespread availability and the broad interoperability between competing commercially provided and publicly available cellular wireless networks 105; and, 3) methods and techniques to send SMS and MMS messages over a commercially provided and publicly available cellular wireless network 105 are well known and documented by those skilled in the electrical arts.

The first GPS module 124 is an electrical device that communicates with the GPS to determine the GPS coordinates of the first GPS module 124. When queried by the first logic module 121, the first GPS module 124 transfers the GPS coordinates to the first logic module 121.

The speaker 125 is a transducer. The speaker 125 receives an electrical signal generated by the first logic module 121. The speaker 125 converts the received electrical signal into an audible sound. The first logic module 121 initiates the operation of the speaker 125 whenever the first logic module 121 initiates the transmission of a message selected from the group consisting of the first message 191 and the second message 192. In the first potential embodiment of the disclosure, the speaker 125 is a buzzer.

The first logic module 121 receives a first set of GPS coordinates from the first GPS module 124. The first logic module 121 receives a second set of GPS coordinates from the personal data device 104. The first logic module 121 compares the first set of GPS coordinates and the second set of GPS coordinates to determine the span of the distance between the master system 101 and the personal data device 104. If the first logic module 121 determines that the span of the distance between the first GPS module 124 and the personal data device 104 is greater than the previously determined distance, the first logic module 121 transmits the first message 191 to the personal data device 104 using a wireless communication link selected from the group consisting of the first wireless communication link 181 and the second wireless communication link 182.

The temperature sensor 113 is a commercially available sensor that measures the temperature by the child safety seat 107. The temperature sensor 113 is monitored by the control circuit 112.

The first logic module 121 monitors the temperature sensor 113. If the first logic module 121 determines that the temperature sensor 113 reads a temperature above the previously determined maximum temperature, the first logic module 121 transmits the second message 192.

The first logic module 121 transmits the second message 192 as an SMS message to an appropriate authority 106 and the personal data device 104. The appropriate authority 106 is a regulatory authority configured to receive a text to 911 message. The text to 911 message is often referred to as an (E)911 message. In most cases, the appropriate authority 106 is a local emergency services center. The second message 192 provides a preprogrammed distress message, the GPS coordinates of the master system 101 at the time the distress message was initiated, and contact information to allow the local emergency services center to contact the personal data device 104.

The power circuit 114 is an electrical circuit. The power circuit 114 provides the electrical power required for the operation of the master system 101 of the invention 100. The power circuit 114 rechargeable structure that allows for the temporary operation of the master system 101 without drawing the electrical power from an external power source 134. The power circuit 114 comprises a rechargeable battery 131, a diode 132, a charging port 133, and an external power source 134. The rechargeable battery 131, the diode 132, the charging port 133, and the external power source 134 are electrically interconnected. The external power source 134 further comprises a charging plug 151. The rechargeable battery 131 is further defined with a first positive terminal 141 and a first negative terminal 142. The external power source 134 is further defined with a second positive terminal 152 and a second negative terminal 153.

The battery 131 is a commercially available rechargeable battery 131. The chemical energy stored within the rechargeable battery 131 is renewed and restored through use of the charging port 133. The charging port 133 is an electrical circuit that reverses the polarity of the rechargeable battery 131 and provides the energy necessary to reverse the chemical processes that the rechargeable battery 131 initially used to generate the electrical energy. This reversal of the chemical process creates a chemical potential energy that will later be used by the rechargeable battery 131 to generate electricity.

The charging port 133 attaches to an external power source 134 using a charging plug 151. The charging port 133 receives electrical energy from the external power source 134 through the charging plug 151. The diode 132 is an electrical device that allows current to flow in only one direction. The diode 132 installs between the rechargeable battery 131 and the charging port 133 such that electricity will not flow from the first positive terminal 141 of the rechargeable battery 131 into the second positive terminal 152 of the external power source 134. In the first potential embodiment of the disclosure, the external power source 134 and the charging port 133 are compatible with USB power requirements.

The pressure sensor 102 mounts in the child safety seat 107. The pressure sensor 102 is a weight sensitive device that detects when the passenger 108 is in the child safety seat 107. The pressure sensor 102 detects the weight of the passenger 108 using a sensing device selected from the group consisting of a pressure plate switch 162 and a piezoelectric sensor. The master system 101 and the pressure sensor 102 are electrically interconnected. The pressure sensor 102 comprises a second housing 161 and a pressure plate switch 162.

The second housing 161 is a casing. The second housing 161 contains the pressure plate switch 162. The second housing 161 is formed with all apertures, form factors, and rigidities necessary to allow the second housing 161 to accommodate the use and operation of the invention 100.

The structure of the second housing 161 is independent of the structure of the master system 101 such that the pressure sensor 102 and the master system 101 are physically independent structures from each other. Methods to form a housing suitable for the purposes described in this disclosure are well-known and documented in the mechanical arts.

In the first potential embodiment of the disclosure, the selected sensing device used in the pressure sensor 102 is the pressure plate switch 162. The pressure plate switch 162 is an electrical switching device that is actuated by the application of weight or pressure to the pressure plate switch 162. The pressure plate switch 162 is defined in greater detail elsewhere in this disclosure. The pressure plate switch 162 of the pressure sensor 102 and the first logic module 121 of the control circuit 112 are electrically interconnected using the cable 103.

The following definitions were used in this disclosure:

Appropriate Authority: As used in this disclosure, an appropriate authority is a previously determined person or organization that is designated to receive alarm or other notification messages regarding a monitored system or activity.

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Battery: As used in this disclosure, a battery is a chemical device consisting of one or more cells, in which chemical energy is converted into electricity and used as a source of power. Batteries are commonly defined with a positive terminal and a negative terminal.

Bluetooth: As used in this disclosure, Bluetooth is a standardized communication protocol that is used to wirelessly interconnect electronic devices.

Buzzer: As used in this disclosure, a buzzer is two lead electrical device that generates an audible sound and a tactile vibration when voltage is applied to the two leads.

Cable: As used in this disclosure, a cable is a collection of insulated wires covered by a protective casing that is used for transmitting electricity or telecommunication signals.

Child Safety Seat: As used in this disclosure, a child safety seat is a safety device configured for use with an automobile. The child safety seat is a restraining device that protects a child from injury should an unfortunate event occur to the automobile.

Commercially Provided And Publicly Available Cellular Wireless Network: As used in this disclosure, a commercially provided and publicly available cellular wireless network refers to subscription based publically available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Diode: As used in this disclosure, a diode is a two terminal semiconductor device that allows current flow in only one direction. The two terminals are called the anode and the cathode. Electric current is allowed to pass from the anode to the cathode.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

GPS: As used in this disclosure, and depending on the context, GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Housing: As used in this disclosure, a housing is a rigid casing that encloses and protects one or more devices.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets and smart phones. See logical device Piezoelectric Effect: As used in this disclosure, the piezoelectric effect refers to a class of materials wherein a strain placed upon the material will result in a redistribution of electrons within the material in a manner that causes an electric charge. This electric charge can be measured as a voltage potential across the material. This effect can be reversed in some of these materials such that the application of an AC voltage to the material will cause a vibration within the material. A material commonly used to take advantage of the piezoelectric effect is polyvinylidene difluoride (CAS 24937-79-9) which is also known as PVDF.

Plug: As used in this disclosure, a plug is an object that is used: 1) as a barrier to block access to a cavity or an aperture; or, 2) a connection device that is inserted into a port, cavity, or aperture for the purpose of attaching a first object to a second object.

Port: As used in this disclosure, a port is an electrical termination that is used to connect a first electrical circuit to a second external electrical circuit. In this disclosure, the port is designed to receive a plug.

PPWN: As used in this disclosure, the PPWN is an acronym for publically provided wireless network. The PPWN refers to a commercially provided and publicly available cellular wireless network.

Pressure Plate Switch: As used in this disclosure, pressure plate switch is a commercially available switching device wherein a switch is placed underneath a flexible or semi-rigid surface such that when pressure is applied to or removed from the flexible or semi-rigid surface the underlying switch is actuated. An example of a commercially marketed pressure switch is commonly marketed as a bed alarm with a sensor pad for dementia patients. The sensor pad is commonly a pressure switch.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Speaker: As used in this disclosure, a speaker is an electrical transducer that converts an electrical signal into an audible sound.

Temperature: As used in this disclosure, temperature refers to a relative measure of the kinetic and vibrational energy contained in the atoms and molecules of a first object (or system) relative to the kinetic and vibrational energy contained in the atoms and molecules of a second object (or system). When two objects (or systems) are in thermal equilibrium, the temperature of the two objects (or systems) is the same.

Transducer: As used in this disclosure, a transducer is a device that converts a physical quantity, such as pressure or brightness into an electrical signal or a device that converts an electrical signal into a physical quantity.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vehicle: As used in this disclosure, a vehicle is a motorized device that is used for transporting passengers, goods, or equipment. The term motorized vehicle refers to a vehicle can move under power provided by an electric motor or an internal combustion engine.

WiFi: As used in this disclosure, WiFi refers to the physical implementation of a collection of wireless electronic communication standards commonly referred to as IEEE 802.11x. With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A passenger detection system comprising
a master system, a pressure sensor, and a cable;
wherein the cable electrically connects the pressure sensor to the master system;
wherein the pressure sensor is monitored by the master system;
wherein the passenger detection system is configured for use with a child safety seat;
wherein the passenger detection system is configured for use with a passenger;
wherein the passenger detection system detects when the passenger is in the child safety seat;
wherein the passenger detection system is configured for use with a personal data device;
wherein the pressure sensor detects when the passenger is seated in the child safety seat;
wherein the pressure sensor mounts in the child safety seat;
wherein the pressure sensor is a weight sensitive device that detects when the passenger is in the child safety seat;
wherein the pressure sensor detects the weight of the passenger using a sensing device selected from the group consisting of a pressure plate switch and a piezoelectric sensor;
wherein the master system and the pressure sensor are electrically interconnected;
wherein a control circuit is an electrical circuit;
wherein the control circuit is a programmable circuit;
wherein the control circuit manages and regulates the operation of the master system;
wherein the control circuit comprises a first logic module, a first communication module, a second communication module, a first GPS module, and a speaker;
wherein the first logic module, the first communication module, the second communication module, the first GPS module, and the speaker are electrically interconnected;
wherein the pressure plate switch of the pressure sensor and the first logic module of the control circuit are electrically interconnected using the cable;
wherein a selected sensing device used in the pressure sensor is the pressure plate switch;
wherein the speaker is a buzzer;
wherein the first logic module receives a first set of GPS coordinates from the first GPS module;
wherein the first logic module receives a second set of GPS coordinates from the personal data device;
wherein the first logic module compares the first set of GPS coordinates and the second set of GPS coordinates to determine the span of the distance between the master system and the personal data device;
wherein the first logic module transmits the first message to the personal data device using a wireless communication link selected from the group consisting of the first wireless communication link and the second wireless communication link when the span fo the distance between the master system and the personal data device is greater than the previously determined distance.
2. The passenger detection system according to claim 1 wherein the master system communicates with the personal data device over a first wireless communication link;
wherein if the master system determines that the span of the distance between the master system and the personal data device is less than a previously determined distance then the master system sends a first message to the personal data device over the first wireless communication link;

wherein if the master system determines that the first wireless communication link has failed then the master system sends the first message to the personal data device over a second wireless communication link and a commercially provided and publicly available cellular wireless network;

wherein the first message is a message indicating that the passenger remains in the child safety seat;

wherein the first message contains the GPS coordinates of the master system.

3. The passenger detection system according to claim 2 wherein the master system monitors the temperature in the air around the child safety seat;

wherein if the measured temperature exceeds a previously determined maximum temperature, the master system sends a second message to the personal data device over the second wireless communication link and the commercially provided and publicly available cellular wireless network;

wherein if the measured temperature exceeds a previously determined maximum temperature, the master system sends the second message to an appropriate authority over the second wireless communication link and the commercially provided and publicly available cellular wireless network;

wherein the second message is a message indicating that the passenger is in a dangerous environment;

wherein the second message contains the GPS coordinates of the master system.

4. The passenger detection system according to claim 3 wherein the master system is an electrical circuit that controls the operation of the passenger detection system;

wherein the master system manages the communication between the passenger detection system and the personal data device;

wherein the master system manages the communication between the passenger detection system and the appropriate authority;

wherein the master system monitors the air temperature at the child safety seat;

wherein the master system generates an audible sound when an alarm condition occurs;

wherein the cable is an electrically conductive structure;

wherein the cable transmits signals between the pressure sensor and the master system.

5. The passenger detection system according to claim 4 wherein the personal data device comprises a second logic module and a second GPS module;

wherein the second logic module is a programmable electronic device;

wherein the second GPS module is an electrical device that communicates with the GPS to determine the GPS coordinates of the second GPS module;

wherein the second GPS module transfers the GPS coordinates to the second logic module.

6. The passenger detection system according to claim 5 wherein the master system comprises a first housing, the control circuit, a temperature sensor, and a power circuit;

wherein the control circuit, the temperature sensor, and the power circuit are electrically interconnected.

7. The passenger detection system according to claim 6 wherein the first housing is a casing;

wherein the first housing contains the control circuit, the temperature sensor, and the power circuit;

wherein the structure of the first housing is independent of the structure of the pressure sensor such that the master system and the pressure sensor are physically independent structures from each other.

8. The passenger detection system according to claim 7 wherein the first logic module is a programmable electronic;

wherein the first communication module is a wireless electronic communication device;

wherein the second communication module is a wireless electronic communication device;

wherein the first communication module establishes the first wireless communication link between the master system and the personal data device;

wherein the second communication module establishes the second wireless communication link between the master system and the commercially provided and publicly available cellular wireless network.

9. The passenger detection system according to claim 8 wherein the first GPS module is an electrical device;

wherein the first GPS module communicates with the GPS to determine the GPS coordinates of the first GPS module;

wherein the first GPS module transfers the GPS coordinates to the first logic module.

10. The passenger detection system according to claim 9 wherein the speaker is a transducer;

wherein the speaker receives an electrical signal generated by the first logic module;

wherein the speaker converts the received electrical signal into an audible sound;

wherein the first logic module initiates the operation of the speaker whenever the first logic module initiates the transmission of a message selected from the group consisting of the first message and the second message.

11. The passenger detection system according to claim 10 wherein the temperature sensor is an electrical device;

wherein the temperature sensor measures the temperature by the child safety seat;

wherein the first logic module monitors the temperature sensor;

wherein if the first logic module determines that the temperature sensor reads a temperature above the previously determined maximum temperature, the first logic module transmits the second message when the temperature sensor exceeds the previously determined temperature;

wherein the first logic module transmits the second message as an SMS message.

12. The passenger detection system according to claim 11 wherein the appropriate authority is a regulatory authority configured to receive a text to 911 message.

13. The passenger detection system according to claim 12 wherein the power circuit comprises a rechargeable battery, a diode, a charging port, and an external power source;

wherein the rechargeable battery, the diode, the charging port, and the external power source are electrically interconnected;

wherein the external power source further comprises a charging plug;

wherein the rechargeable battery is further defined with a first positive terminal and a first negative terminal;

wherein the external power source is further defined with a second positive terminal and a second negative terminal.

14. The passenger detection system according to claim 13 wherein the charging port is an electrical circuit that reverses the polarity of the rechargeable battery;

wherein the charging port electrically connects to the external power source using the charging plug;

wherein the charging port receives electrical energy from the external power source through the charging plug;

wherein the diode is an electrical device that allows current to flow in only one direction;

wherein the diode installs between the rechargeable battery and the charging port such that electricity will not flow from the first positive terminal of the rechargeable battery into the second positive terminal of the external power source.

15. The passenger detection system according to claim 14 wherein the pressure sensor comprises a second housing and a pressure plate switch;

wherein the second housing contains the pressure plate switch.

16. The passenger detection system according to claim 15 wherein the second housing is a casing;

wherein the structure of the second housing is independent of the structure of the master system such that the pressure sensor and the master system are physically independent structures from each other.

\* \* \* \* \*